US006471934B2

(12) United States Patent
Schulz et al.

(10) Patent No.: US 6,471,934 B2
(45) Date of Patent: Oct. 29, 2002

(54) DISPROPORTIONATION OF SULFURYL CHLORIDE FLUORIDE

(75) Inventors: Alf Schulz, Wedemark; Matthias Rieland; Eckhard Hausmann, both of Hannover, all of (DE)

(73) Assignee: Solvay Fluor und Derivate GmbH, Hannover (DE)

( * ) Notice: Subject to any disclaimer, the term of this patent is extended or adjusted under 35 U.S.C. 154(b) by 53 days.

(21) Appl. No.: 09/780,428

(22) Filed: Feb. 12, 2001

(65) Prior Publication Data

US 2001/0014308 A1 Aug. 16, 2001

(30) Foreign Application Priority Data

Feb. 11, 2000 (DE) .......................................... 100 06 247

(51) Int. Cl.[7] ............................................... C01B 17/45
(52) U.S. Cl. ....................... 423/468; 423/500; 423/539; 423/467
(58) Field of Search ................................ 423/467, 468, 423/500, 502, 539

(56) References Cited

U.S. PATENT DOCUMENTS

| 2,772,144 | A | | 11/1956 | Belf et al. ................... 423/468 |
|---|---|---|---|---|
| 2,879,138 | A | * | 3/1959 | Mutterties ................... 423/468 |
| 3,092,458 | A | * | 6/1963 | Ruh ............................ 423/468 |
| 3,320,030 | A | | 5/1967 | Bisignani et al. ........... 423/468 |
| 3,403,144 | A | | 9/1968 | Lam et al. ................... 423/468 |
| 4,003,984 | A | | 1/1977 | Jones et al. ................. 423/468 |
| 4,102,887 | A | | 7/1978 | Carlsson et al. ............ 546/346 |
| 4,102,987 | A | | 7/1978 | Cook et al. .................. 423/468 |
| 4,382,072 | A | * | 5/1983 | Fujioka et al. .............. 423/468 |
| 4,950,464 | A | * | 8/1990 | Fujioka et al. .............. 423/468 |
| 6,143,269 | A | * | 11/2000 | Schulz et al. ............... 423/468 |
| 6,238,642 | B1 | * | 5/2001 | Schulz et al. ............... 423/468 |

OTHER PUBLICATIONS

G. Melin, "From Sulfur or Hydrogen Sulfide" Publishing House Chemistry, 1966, (no month).
Copy of the International Search Report, May 7, 2001.

* cited by examiner

*Primary Examiner*—Ngoc-Yen Nguyen
(74) *Attorney, Agent, or Firm*—Crowell & Moring LLP

(57) ABSTRACT

A method of preparing sulfuryl fluoride by disproportionation of sulfuryl chloride fluoride in the gas phase on activated carbon.

3 Claims, No Drawings

DISPROPORTIONATION OF SULFURYL CHLORIDE FLUORIDE

BACKGROUND OF THE INVENTION

The invention relates to a process for the preparation of sulfuryl fluoride by disproportionation of sulfuryl chloride fluoride. Sulfuryl fluoride can be used as a pesticide

SUMMARY OF THE INVENTION

It is an object of the present invention to provide a process for the preparation of sulfuryl fluoride.

This and other objects are achieved in accordance with the present invention by providing a process for the preparation of sulfuryl fluoride comprising contacting sulfuryl chloride fluoride in the gas phase with activated carbon at a temperature of at least 130° C., whereupon sulfuryl fluoride and $SO_2$ and also $Cl_2$ form.

DESCRIPTION OF PREFERRED EMBODIMENTS

The process according to the invention provides for the preparation of sulfuryl fluoride by contacting sulfuryl chloride fluoride with activated carbon in the gas phase at a temperature of at least 130° C. Sulfuryl fluoride and sulfur dioxide and chlorine form thereupon.

Preferably the process is carried out at a temperature in the range from 180 to 400° C. A temperature in the range from 180 to 280° C. is particularly preferred.

The resulting gas mixture can be separated by conventional methods, such as passing through water or fractional evaporation.

An advantage of the invention is that sulfuryl chloride fluoride, which occurs, for example, as a by product of the fluorination of sulfur dioxide and chlorine with hydrogen fluoride, can be converted in a simple manner into $SO_2F_2$ without the known problems of deactivation of the catalyst in the hydrofluorination of $SO_2FCl$ occurring.

The following example is intended to illustrate the invention in further detail, without limiting its scope.

EXAMPLE

Preparation of $SO_2F_2$ by disproportionation of $SO_2FCl$ 39.83 g activated carbon (Shiragasi C2X4/6–2) was is poured into a glass tube heated with a heating strip and having a length of 280 mm and an internal diameter of 20 mm and was heated fully to 200° C. for approximately 2 hours with approximately 2 liters/hour of nitrogen ($N_2$) being passed therethrough. Then $SO_2FCl$ was passed through the heated, activated carbon-containing glass tube with the same rotameter setting. Investigation of the exiting gases by gas chromatography revealed that complete disproportionation of the $SO_2FCl$ occurred in accordance with the following equation:

$$2\ SO_2FCl \rightarrow SO_2F_2 + SO_2 + Cl_2.$$

The foregoing description and example have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A process for the preparation of sulfuryl fluoride comprising contacting sulfuryl chloride fluoride in the gas phase with activated carbon at a temperature of at least 130° C., whereupon sulfuryl fluoride and $SO_2$ and also $Cl_2$ form.

2. A process according to claim 1, wherein said contacting is carried out at a temperature in the range from 180 to 400° C.

3. A process according to claim 2, wherein said contacting is carried out at a temperature in the range from 180 to 280° C.

* * * * *